United States Patent

[11] 3,572,031

| [72] | Inventor | Eugene J. Szetela<br>South Windsor, Conn. |
|---|---|---|
| [21] | Appl. No. | 840,954 |
| [22] | Filed | July 11, 1969 |
| [45] | Patented | Mar. 23, 1971 |
| [73] | Assignee | United Aircraft Corporation<br>East Hartford, Conn. |

[54] VARIABLE AREA COOLING PASSAGES FOR GAS TURBINE BURNERS
1 Claim, 8 Drawing Figs.

[52] U.S. Cl. .................................................... 60/39.65,
60/39.66, 431/352
[51] Int. Cl. .................................................... F02c 7/18
[50] Field of Search ........................................... 60/39.65,
39.66, 265; 165/147, 169; 431/351, 352

[56] References Cited

UNITED STATES PATENTS

| 2,446,059 | 7/1948 | Peterson et al. | 60/39.65X |
| 2,498,728 | 2/1950 | Way | 60/39.65X |
| 3,131,535 | 5/1964 | Hensley | 165/169X |
| 3,182,448 | 5/1965 | Rabe | 60/39.66X |
| 3,190,070 | 6/1965 | Nev | 60/39.66X |

FOREIGN PATENTS

| 1,115,328 | 12/1955 | France | 60/39.65 |
| 597,205 | 1/1948 | Great Britain | 60/39.65 |

*Primary Examiner*—Douglas Hart
*Attorney*—Donald F. Bradley

ABSTRACT: A cooling apparatus for maintaining the walls of a gas turbine burner within acceptable temperature limits. Cooling air which is also used for combustion is passed through variable cross-sectional area cooling passages in the "Thermal Skin$_{TM}$" walls of the burner to maintain a constant temperature distribution along the walls.

PATENTED MAR 23 1971   3,572,031

INVENTOR
EUGENE J. SZETELA
BY Donald J. Bradley
ATTORNEY

VARIABLE AREA COOLING PASSAGES FOR GAS TURBINE BURNERS

BACKGROUND OF THE INVENTION

1. Field of the Invention

This invention relates to the cooling of burner walls in gas turbine engines, and specifically to an improved "Thermal Skin$_{TM}$" type cooling apparatus in which variable cross-sectional area or variable depth cooling passages provide a constant temperature distribution along the walls of the burner.

2. Description of the Prior Art

Conventional louvered cooling methods for providing cooling to the walls of gas turbine burner cans are unacceptable for high-temperature operation. Conventional louver schemes are inefficient because the structure is highly overcooled locally, the pressure loss through the metering holes is not effectively used for cooling, and mixing with the hot gases removes the cooling film before its heat source is fully expended. In addition louver cooled structures are highly stressed due to the thermal gradients produced by the local overcooling. These thermal stresses produce durability problems such as weld failures, louver lip warpages and keyhole slot cracking.

Recently a cooling technique known as "Thermal Skin$_{TM}$" or Finwall has been developed which is a considerable improvement over conventional louvered cooling methods. This construction consists of many cooling passages between the inner and outer walls of the burner can, the passages having a high length-to-diameter ratio. The passages are formed by a plurality of fins or webs between the two walls to augment the heat transfer between the inner wall which is exposed to high heat and the cooled outer wall. The webs or fins also strengthen the structure. Air is scooped in through the cooling passages and discharged as a coolant film for the immediate downstream section of the burner wall. The coolant flow is metered by the pressure losses through the section predominantly due to friction and exit losses. With this cooling technique engine performance is improved because the amount of air required for cooling is reduced, the durability of the engine is improved, and the engine may be operated with higher gas stream temperatures without excessive cooling flow penalties. The temperature gradients and hence thermal stresses in the structure are kept small.

In addition, thermal skin construction is stronger than conventional louver construction for equivalent weight in an annular configuration. Savings in cooling are redirected through combustor or dilution holes.

"Thermal Skin$_{TM}$" is described and claimed in copending application Ser. No. 812,607 filed Apr. 2, 1969 by Perry Goldberg and Irwin Segalman entitled "Wall Structure And Method OFF Manufacturing," the application being assigned to the same assignee.

SUMMARY OF THE INVENTION

A primary object of this invention is to provide an improved cooling apparatus for gas turbine burners.

In accordance with the present invention the cooling passages in a "Thermal Skin$_{TM}$" wall are varied in cross-sectional area along their length to vary the velocity of the cooling fluid passing therethrough in a manner which will produce a substantially constant wall temperature.

In various embodiments, the variation in cross-sectional area will take the form of a variable depth channel or a variable shaped corrugated material between two walls. The cross-sectional area of the passage may increase or decrease linearly along its length, or may be varied in any other known manner.

DESCRIPTION OF THE PREFERRED EMBODIMENT

As described previously, the "Thermal Skin$_{TM}$" concept as applied to gas turbine burner cans is a considerable improvement over the conventional louver for cooling the walls of the burner can. Conventional louvers when used for cooling, waste the pressure loss because the resulting wall temperature profile is not uniform. "Thermal Skin$_{TM}$" offers the advantage of providing a more constant temperature profile. The variable cross-sectional area "Thermal Skin$_{TM}$" disclosed herein further improves the operation by producing a substantially constant wall temperature along the walls of the burner can.

It is known that the rate of heat transfer in a cooling passage depends upon the velocity of the cooling gas moving therethrough. As the cooling air is heated by absorbing the heat from the walls, the rate of cooling decreases and the temperature of the walls increase. It is also known that the velocity of the cooling fluid should be increased as the temperature of the cooling fluid is increased to maintain a constant wall temperature.

This invention provides a variable cross-sectional area cooling passage in which the coolant fluid changes in velocity as it proceeds through the passage by virtue of a change in the cross-sectional area of the passage. This variation in velocity produces a variable rate of cooling, but since the temperature of the cooling fluid is also varied, the resultant effect is to maintain a constant wall temperature. In the embodiments described there is little or no wasted coolant, and a far superior temperature distribution is provided to the walls of the burner.

Figure 1:
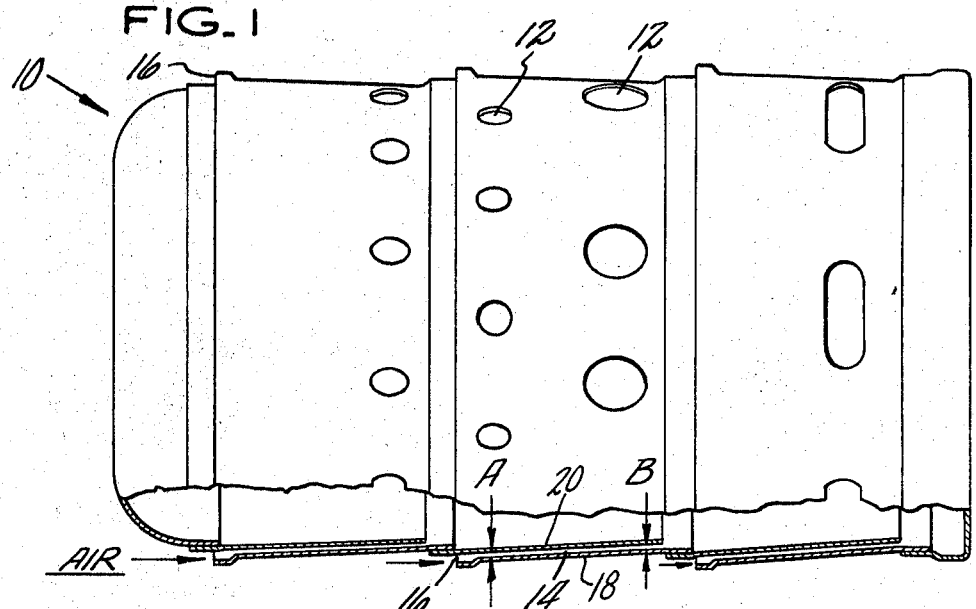
FIG. 1 is a partially broken away elevation of a burner can embodying this invention.

Referring specifically to FIG. 1 there is shown a conventional burner can 10 for gas turbine engines. Air from the compressor section of the engine is force into the shroud surrounding the burner can and through the various sized combustion holes 12 situated in the walls of the burner can 10. A portion of the compressor air passes into the cooling passages 14 between the outer wall and the inner wall of the burner can through holes 16 in the upstream side of each burner section. Air scoops or any other known arrangement may be provided to assist in forcing air into the cooling passages 14 through holes 16. The compressor air which enters the combustion holes 12 is combined with fuel and combusted within the burner can 10 as is well known to those skilled in the art.

Figure 2:
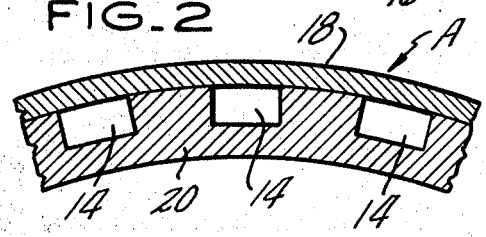
FIG. 2 is a cross-sectional view of section AA of FIG. 1.
Figure 3:
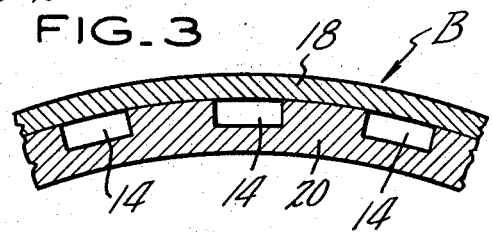
FIG. 3 is a cross-sectional view of section BB of FIG. 1.

In FIGS. 2 and 3, there is shown in cross section one configuration for the walls of the burner can 10. FIG. 2 shows the configuration in the upstream portion of the passage 14 shown at AA, and FIG. 3 shows the configuration in the downstream section of the passage 14 shown at BB.

Referring to FIG. 2, the cooling passages 14 are formed when the outer wall section 18 is joined by an inner wall section 20, the portion of the wall 20 being cut out so that the junction of the two walls forms the passages. The cutout portion of the inner wall 20 is varied in depth along its length so that at the downstream section of the burner can wall, shown in FIG. 3, the passages 14 have a smaller depth than the passages in FIG. 2. The width of the cooling passages 14 remains constant along the length of the burner can section, and by varying the depth of the cutout in wall 20, the cross-sectional area of the coolant passages is decreased.

The two-piece structure of FIGS. 2 and 3 is preferably made from a high-temperature metal such as Hastelloy X. TD-nickel or other appropriate metals may be used.

As shown in FIGS. 2 and 3, walls 18 and 20 are of constant thickness along their entire length, i.e., the distance from the passages 14 to the edges of the walls remains the same, regardless of the fact that the depth of the passages vary. This is the preferred embodiment. However, it is recognized that the wall thickness may be variable along its length and the configuration may be preferred in some applications depending on the relative ease of construction, weight, cost, etc.

For some applications it may be desired to use variable width passages rather than variable depth passages to change the cross-sectional area of the passages along their length.

Figure 4:
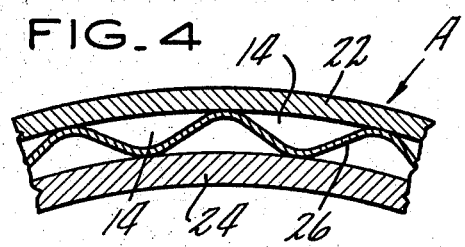
FIG. 4 is an alternate cross-sectional view of section AA of FIG. 1.
Figure 5:
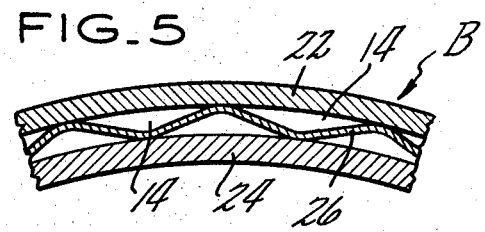
FIG. 5 is an alternate cross-sectional view of section BB of FIG. 1.

FIGS. 4 and 5 show another embodiment for providing a variable cross-sectional area coolant passage. The embodiments of FIGS. 4 and 5 are similar to FIGS. 2 and 3, but use a three-piece honeycomb-type wall structure. Referring to FIG. 4, the outer wall 22 and inner wall 24 are joined by a corrugated metallic piece 26 to form passages 14 between the corrugated piece 26 and the inner and outer walls of the burner can. The walls 22 and 24 have a constant thickness while the depth of the corrugated material 26 has been decreased considerably along the length of the passages to decrease the cross-sectional area of the passages.

The embodiments of FIGS. 2 through 5 may be formed in many well-known ways such as variable depth machine, variable depth etching or a variable die.

Figure 6:
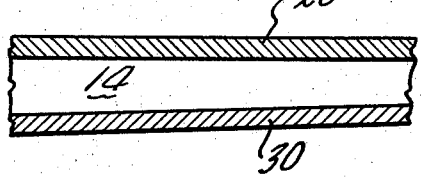
FIG. 6 is a longitudinal view of the variable depth channel of FIGS. 2 and 3.
Figure 7:
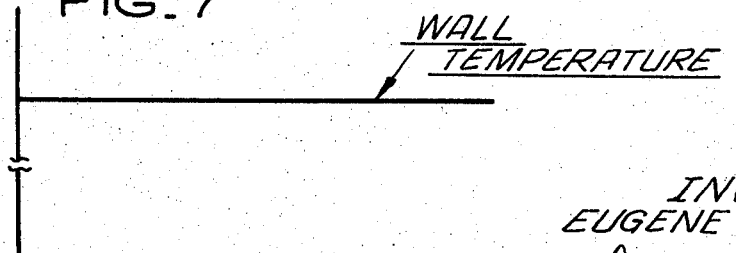
FIG. 7 shows graphically the variation in temperature along the wall of the embodiment of FIG. 6.

FIG. 6 and FIG. 7 show the effect of the variable cross-sectional area cooling passage for a typical application. While the cross section of the passage 14 in FIG. 6 decreases in area, the temperature of the walls 28 and 30 remain substantially constant along the length of the walls as shown in FIG. 7.

Figure 8:
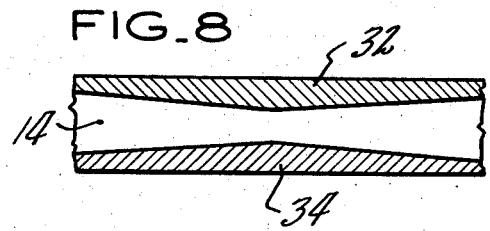
FIG. 8 is a longitudinal view of a cooling channel having a cross-sectional area which decreases and then increases.

FIG. 8 shows a further variation in which the passage 14 is decreased in depth, and then increased in depth to form a passage which decreases and then increases in cross-sectional area. Walls 32 and 34 may be of variable thickness as shown, or may be of constant thickness. The shape of the passage may be varied so that the temperature profile is matched to the velocity requirements of the fluid passing through the passage as a function of the heat balance between the heat from the burner gases and the coolant fluid.

The ratio of the cross-sectional areas to the length of the passages may vary depending on the specific application. The rate of area change may be either linear or nonlinear.

One of the advantages of the variable depth or variable cross-sectional area "Thermal Skin$_{TM}$" of this invention is that the length of the flame in the burner can is considerably reduced. The air used for cooling in the passages is not essential to combustion and does not contribute to combustion. Hence, the more air contained in the cooling walls, the longer the flame in the burner can. Since the construction of this invention is more efficient than the prior art, less cooling air is required and the length of the flame is shortened.

Because less cooling air is required to cool the walls of the burner can, higher burner performance is achieved. Furthermore, a higher average wall temperature is permitted, producing a lesser tendency to form carbon and to produce smoke than in other types of burners.

While this invention has been described in relation to a gas turbine burner, it will be evident that its application is not limited thereto, and that variable cross-sectional area cooling passages may be used for other applications such as turbine vanes, hypersonic inlets for propulsion, and many other uses.

I claim:

1. In a combustion chamber for a gas turbine engine:
an outer wall portion forming the outer casing of said combustion chamber;
an inner wall portion positioned inside said outer wall portion;
one of said wall portions containing a plurality of peripherally spaced recesses about its surface, the separation between said recesses being equal to or larger than the width of each said recess;
said inner and outer wall portions being of substantially constant thickness, the said one wall portion abutting the said other wall portion along the separations between the recesses in said one wall portion whereby said recesses form a plurality of longitudinally extending closed passages with the surface of said other wall portion, each of said passages being substantially rectangular in cross section, the width of each said passage being constant and the depth of each said passage being varied along its longitudinal axis to vary the cross-sectional area of each said passage along its longitudinal axis;
a source of cooling fluid for said combustion chamber, means for causing at least a portion of said cooling fluid to flow through said passages to provide cooling to said walls portions, the velocity of said fluid being varied with variations in the cross-sectional area of said passages to provide a variable rate of cooling and produce a substantially uniform temperature profile along the walls of said chamber.